(No Model.)

C. I. SAUNDERS.
FRUIT GATHERER.

No. 309,362. Patented Dec. 16, 1884.

Witnesses.
A. Ruppert.
Wm A. Johnson

Inventor.
C. I. Saunders.
by J. R. Nottingham
atty.

UNITED STATES PATENT OFFICE.

CROCKETT I. SAUNDERS, OF ROCKY MOUNT, VIRGINIA.

FRUIT-GATHERER.

SPECIFICATION forming part of Letters Patent No. 309,362, dated December 16, 1884.

Application filed July 28, 1884. (No model.)

*To all whom it may concern:*

Be it known that I, CROCKETT I. SAUNDERS, a citizen of the United States, residing at Rocky Mount, in the county of Franklin and State of Virginia, have invented certain new and useful Improvements in Fruit-Gatherers, of which the following is a specification, reference being had therein to the accompanying drawings.

My invention relates to fruit-gatherers; and the novelty consists in the construction, arrangement, and adaptation of parts, as will be more fully hereinafter set forth, and specifically pointed out in the claims. Various devices for this purpose have been proposed, several of which employ a stationary portion and a movable portion hinged thereto, the fruit being grasped or embraced by these two portions as the movable portion is manipulated by a cord, and the parts being held open by a spring. I employ these parts substantially; but my construction is such that I avoid some of the difficulties heretofore experienced in this class of implements, while at the same time said construction multiplies the usefulness of the device, and allows its successful manipulation in position where the ordinary gatherer would be unwieldy and inefficient. My construction adapts the device to operate directly upon the twig upon which the fruit hangs. The device, by reason of its peculiarities of construction, is adapted to pick cherries very successfully without damaging the fruit, and in case of larger fruit—as apples, peaches, &c.— the operator has facilities for depositing the fruit in a basket or other receptacle placed upon the ground without bruising the fruit in the least.

The device may be used in connection with a flexible tube, which leads to a receptacle, or may be employed without such tube, the change from one to the other being easily and quickly made.

The essential objects of the invention being to provide a fruit-gatherer which shall be inexpensive in manufacture, simple in construction, and efficient in service, the said invention consists in the mechanism fully illustrated in the accompanying drawings, which form a part of this specification, and in which—

Figure 1:
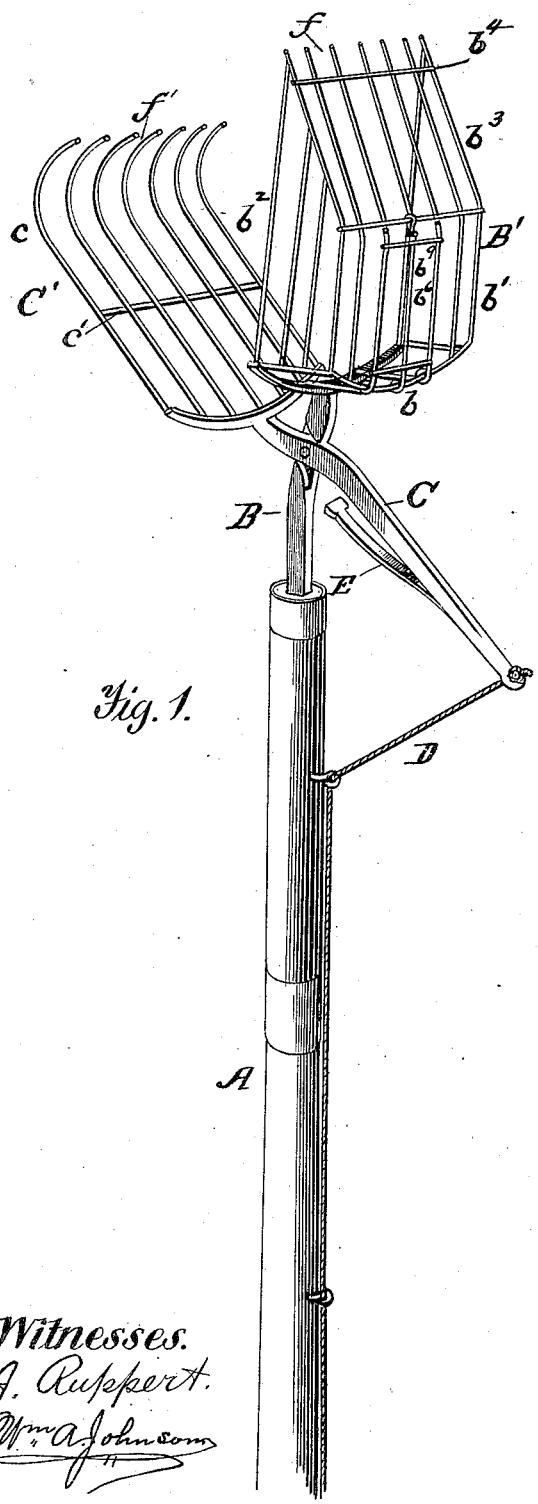
Figure 2:
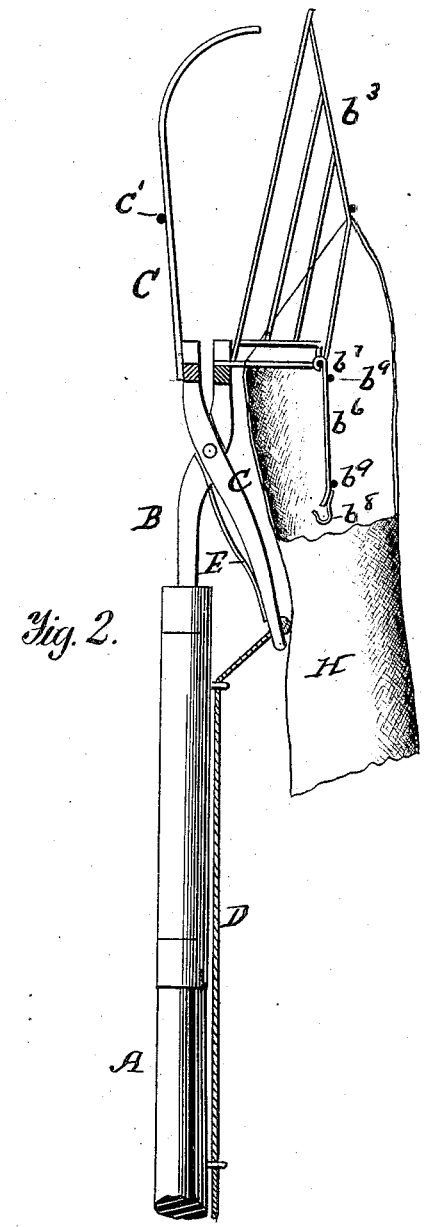

Figure 1 is a perspective view, and Fig. 2 a section with parts in elevation.

In Fig. 1 the device is illustrated in its most complete form, and in Fig. 2 its adaptation to be used in relation to a flexible conducting-tube is shown.

To enable others to make and use the invention, I will describe its construction and mode of operation, referring for that purpose to the drawings.

A designates an extensible handle, carrying a stationary shank, B, and basket B', to which shank is pivoted the handle C of a movable basket, C', a spring, E, serving to hold these baskets apart, and a cord, D, serving to force them together and overcome the action of said spring when desired. These parts, except as relates to the baskets, are of ordinary construction. The baskets B' C' are formed of wires, and their peculiar construction is important. The basket B' is formed with back $b$, bottom $b'$, and sides $b^2$, and with an inclined front $b^3$. The wires which form this inclined front are arranged to leave open spaces $f$ between their forward extremities, which spaces are limited by the cross-wire $b^4$. Similar spaces, $f'$, are formed between the extensions of the bent wires $c$, which form the basket C', and these spaces are limited by the cross-wire $c'$. When the baskets are forced together, the ends of the wires $c$ pass through the spaces $f$, and the fruit—say an apple—being inclosed by the baskets, its supporting-twig is held in one of the spaces $f$ or $f'$, or both. This arrangement of spaces which are to embrace the twig I deem to be important, as the twig may be broken by a pull or by a sidewise thrust. The device may be reversed and the twig be brought into contact with the cross-wire $b^4$, when a thrust will break it. This construction of the wires allows a pull, a side motion, or a direct thrust to be made, and in either case the force will be brought directly upon the twig. By this means I avoid all necessity for a cutting-edge, and allow the twig to break wherever it is weakest. The apple or other fruit having been plucked, the operator has only to lower the basket end and release the tension upon the cord, when the fruit will gently ride down the incline $b^3$ out of the basket without any bruise or jar. This construction to form spaces $f$ and $f'$ also allows the device to be employed with much success in picking cherries, the stems passing in the spaces, and the fruit being caught by the wires. The bottom $b'$ is formed in part of a hinged door, consisting of a wire, $b^6$, hinged at $b^7$, and having a securing-hook, $b^8$, and cross-wires $b^9$.

When the device is used as a picker, as hereinbefore described, and as illustrated in Fig. 1, this hook $b^8$ is engaged as shown; but by disengaging said hook the bottom or door opens, and a flexible tube, H, may be readily secured to the basket B', to conduct the fruit to the hand of the operator or to a proper receptacle. (Not shown.)

The points upon which I rely for novelty reside in the construction of the baskets, in the spaces $f$ and $f'$, the inclined side $b^3$, and in the hinged door $b^6$.

What I claim as new, and desire to secure by Letters Patent of the United States, is—

1. In a fruit-gatherer, the basket B', formed of wire, with inclined side $b^3$, spaces $f$, and cross-wire $b^4$, combined with the movable basket C', and operating connections, as set forth.

2. The combination of the stationary basket formed of wires, and having spaces $f$ and cross-wire $b^4$, the movable basket C', having spaces $f'$ and cross-wire $c'$, the spring, the rope, and the handle, as set forth.

3. The combination of the wire basket B', having the hinged door, the wire basket C', and a conducting-tube H, as and for the purpose set forth.

In testimony whereof I affix my signature in presence of two witnesses.

CROCKETT I. SAUNDERS.

Witnesses:
    WM. H. KEENEY,
    N. C. CARPER.